April 20, 1965 W. R. HAUSER ETAL 3,179,552
PRESSURE-SENSITIVE ADHESIVE TAPE
Filed Sept. 17, 1959

INVENTORS
WILLIAM REXFORD HAUSER
ROBERT CAMPBELL BROWN
BY
Carpenter, Abbott, Coulter & Kinney
ATTORNEYS

3,179,552
PRESSURE-SENSITIVE ADHESIVE TAPE
William Rexford Hauser, Maplewood, and Robert Campbell Brown, St. Paul, Minn., assignors to Minnesota Mining and Manufacturing Company, St. Paul, Minn., a corporation of Delaware
Filed Sept. 17, 1959, Ser. No. 840,734
3 Claims. (Cl. 161—143)

This invention relates to a novel high-strength filament-reinforced pressure-sensitive adhesive tape wound upon itself in roll form.

The tape product is of the film-backed type, coated on one side with a pressure-sensitive adhesive layer, and is wound directly upon itself with the adhesive side facing inwardly. This adhesive tape is aggressively tacky in its normal dry state and firmly bonds to a wide variety of surfaces upon mere contact without need of more than finger pressure or the like. It can be unwound from the roll, and removed from surfaces, without loss of integrity and without gumming the fingers.

This tape is free of fibrous material other than the reinforcing filaments. The latter are nonwoven and are present in the form of a monolayer of longitudinal lineally-aligned yarns buried between the backing film and the pressure-sensitive adhesive layer such that each yarn is partly embedded in the backing film and partly embedded in the adhesive.

The present tape has a hard smooth film back which is oilproof and waterproof, and is dimensionally stable. The tape is well adapted for uses as a high-strength pressure-sensitive tape in situations where these attributes are of particular value, as where the applied tape may be exposed to oily materials, water or highly humid atmospheric conditions. It can be employed, for example, as an electrical coil wrapping tape, and as a bundling, strapping or palletizing tape.

Figure 1:
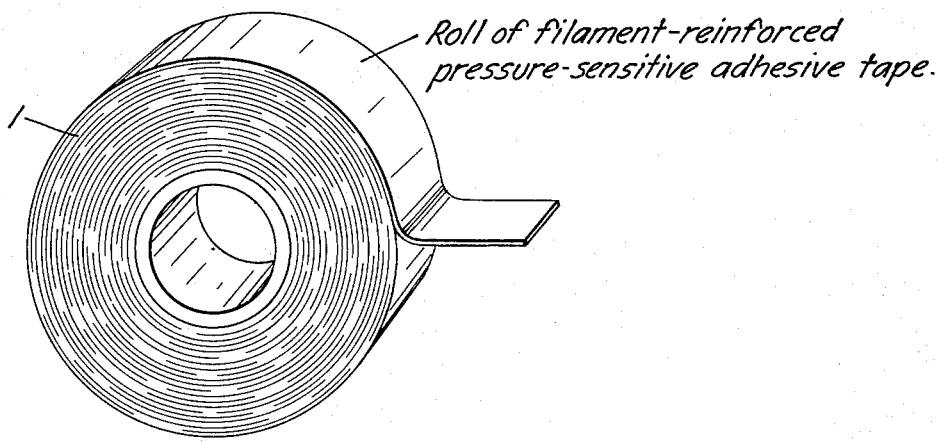
Figure 2:
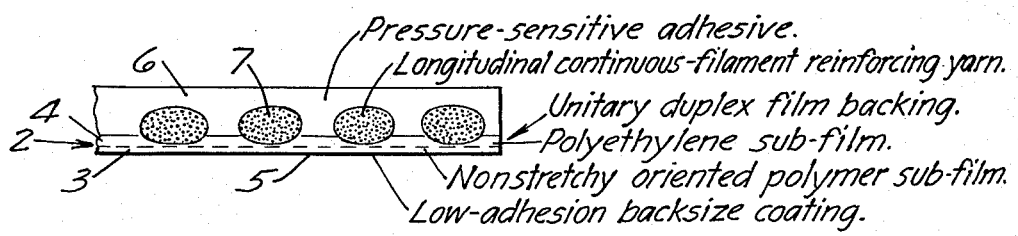

Referring to the accompanying diagrammatic drawing, FIG. 1 shows a roll of the filament-reinforced pressure-sensitive adhesive tape 1, and FIG. 2 shows an exposed tip edge of an illustrative embodiment of this adhesive tape. As indicated in FIG. 2, the tape has a flexible unitary duplex backing film 2, formed of a thin hard nonstretchy oriented polymer sub-film 3 and a substantially thicker polyethylene sub-film 4 which are interfacially integrated to form a permanently unitary composite film. A low-adhesion backsize coating 5 is carried by the smooth flat outer surface of the oriented polymer sub-film and provides the tape with a low-adhesion back surface. A monolayer of nonwoven longitudinal lineally-aligned continuous-filament reinforcing yarns 7 is partially embedded and autogenously anchored in the polyethylene sub-film of the backing. An aggressively tacky rubber-resin type pressure-sensitive adhesive coating 6 is applied thereon, in which the yarns are partially embedded so as to be completely encased and sealed by the backing film and adhesive; the adhesive coating having a flat exposed surface which provides the normally tacky adhesive face of the tape. In the wound roll of such tape, the pressure-sensitive adhesive coating faces inwardly and in direct contact with the low-adhesion backsize surface of the underlying convolution. This unitary structure permits the adhesive tape to be unwound from the roll without splitting or delaminating, despite the aggressively tacky nature of the adhesive.

This flexible unitary duplex backing film is to be distinguished from laminated films formed of two or more different films that are adhered or glued together. The thin hard oriented polymer sub-film is inherently oilproof, waterproof and dimensionally stable. It is nonstretchy so as to be relatively inextensible and nondistortable to prevent the duplex film as a whole from distorting or stretching during manufacture of the tape and during normal handling of the product. It is selected so as to be capable of integrating with the polyethylene sub-film. Oriented polyester and polyamide films are preferred examples. This sub-film provides the tape with a flat back side which is strong, tough, glassy, relatively hard, waterproof, heat-resistant, and resistant to oils and to hydrocarbon solvents. The thicker polyethylene sub-film (in which the yarns are partially embedded) is nonrubbery and is amorphous, waxy, soft, yieldable, stretchable and thermoplastic. It is waterproof and is highly impermeable to moisture vapor. It has a broad softening temperature range which is lower than the narrow softening temperature range or melting point of the oriented polymer sub-film, the latter remaining hard at temperatures in the thermosoftening range of the former. The caliper thickness of the duplex film is approximately 1 to 2.5 mils; that of the oriented polymer sub-film approximately 0.2 to 0.7 mil, and that of the polyethylene sub-film approximately 1 to 2 mils; the thickness of the polyethylene sub-film thus being substantially greater than that of the oriented polymer sub-film.

The low-adhesion backsize is a micro-thin coating of a polymer which firmly bonds to the back surface of the backing film, and yet presents an outer exposed surface to which the tacky pressure-sensitive adhesive adheres (when the tape is wound in a roll) with substantially less force than it would to the substrate film surface, thereby making it possible to remove tape from the roll with less effort and also reducing the force tending to split the tape during unwinding. Low-adhesion back-sizes are known in the pressure-sensitive adhesive tape art and examples are described in U.S. Patents Nos. 2,532,011 (November 28, 1950) and 2,607,711 (August 19, 1952).

During manufacture of the product, the yarns, each of which is formed of many continuous filaments and has a twist, are autogenously anchored in the backing film by pressing a layer of yarns against the polyethylene side while heating to temporarily soften the polyethylene, thereby causing the yarns (which are substantially thicker than the polyethylene sub-film) to become partially embedded in a stable relationship. The pressing action flattens the yarns somewhat. The waxy nonadhesive nature of the polyethylene prevents more than slight adhesive bonding to the smooth filament surfaces. However, the filaments provide each yarn with a twisted lenticular surface to which the contacting polyethylene conforms and there is some penetration of the polyethylene into the yarn structure. Each yarn is thus mechanically gripped and is stably retained in place during subsequent application of the pressure-sensitive adhesive coating and during unwinding and application of the tape product. The oriented polymer sub-film remains hard during the heating and pressing operation and thus provides a film base which permits the yarns to be pressed into the warm and soft polyethylene sub-film without penetrating or distorting the back portion of the duplex film backing, which thus retains a smooth glossy flat surface from which the yarns are spaced in a controlled manner.

The rubber-resin type pressure-sensitive adhesive is waterproof and is soft, stretchy and somewhat elastic. Such adhesives are well known in the adhesive tape art and are compounded of a natural or synthetic rubber or elastomer and a tackifier resin, or consist of an equivalent synthetic high polymer which is inherently both tacky and rubbery. A vulcanizing agent may be included so as to render the adhesive resistant to elevated temperatures. The adhesive is aggressively tacky in its normal dry state, and yet is more cohesive than adhesive, so that it retains its integrity and does not offset or leave a residue when the tacky tape is removed from surfaces to which temporarily applied or is handled with the fingers. The adhesive coating layer makes intimate adherent contact with the filament yarns and provides a tacky viscoelastic covering in which they are partially embedded, and it penetrates between the yarns to make limited adherent contact with the polyethylene surface of the backing film. Application of an adhesive coating solution permits of adhesive penetrating into the yarns so as to unify the filaments. An illustrative procedure involves thinly coating the yarn side with a volatile solution of adhesive so as to establish intimate contact and impregnate the yarns. Following drying of the web, a layer of dry pressure-sensitive adhesive (which had previously been formed by coating on a temporary supporting film) is transferred and bonded to this coated surface of the web to supply a functional pressure-sensitive adhesive coating. This layer is sufficiently thick and conformable to provide a flat exposed adhesive surface. The dry web is then slit and wound into tape rolls of desired size.

Thus the yarns are completely encased and sealed by a composite waterproof and moistureproof matrix which is soft and yieldable and permits of relative motion of the yarns when the tape is subjected to tension so as to distribute the load between the yarns. The lengthwise tensile strength of the tape is mainly contributed by these lineally-aligned load-carrying filament yarns. The crosswise strength is mainly contributed by the backing since the yarns are parallel to each other and the adhesive has little strength.

As noted above, the partially-embedded yarns are not adhesively bonded to the backing film. The mechanical gripping is not alone sufficient to prevent them from being lifted away. The total contact area of the pressure-sensitive adhesive to the backing film is limited by the intervening presence of the yarns. Moreover, pressure-sensitive adhesives have a much lower specific adhesion to polyethylene film surfaces than to the usual surfaces contacted by the tape during normal usage. In fact polyethylene films, and papers coated therewith, have been employed as readily removable low-adhesion liners for temporarily supporting or protecting pressure-sensitive adhesive layers or coatings. Hence it might logically have been expected that the present tape structure would be impractical because of lack of strength of unification between the backing film and the yarns and pressure-sensitive adhesive, making the aggressively tacky tape vulnerable to splitting or delamination upon unwinding from the roll and upon removing from surfaces to which temporarily applied.

Contrary to such expectation, it has been discovered that the present tape does maintain its unity when peeled back from smooth surfaces to which applied. Unwinding from a roll in the usual dispensers generally involves a tape removal angle of about 90° but even this unwinding action has been found to be trouble-free when the tape backing is provided with a low-adhesion backsize to reduce the force required for unwinding.

Prior patents on filament-reinforced film-backed pressure-sensitive adhesive tapes have disclosed structures wherein the yarns or strands were adhered to an independent backing film by an interposed rubbery adhesive or bonding material prior to application thereover of the functional pressure-sensitive adhesive coating. The bonding adhesive was preferably itself a rubbery pressure-sensitive adhesive although other rubbery bonding materials could be used. The yarns were thus wholly embedded in a composite layer of rubbery bonding material applied to the film backing, so as to be spaced from and adhered to the flat backing film surface. There was no recognition in such patents of the feasibility of omitting the bonding adhesive coating and autogenously anchoring the yarns in a nonadhering nonrubbery backing film by partially embedding therein. Thus see U.S. Patents Nos. 2,750,030—2,750,314—2,750,315 (all issued June 12, 1956). The present structure requires only one adhesive coating (this being the pressure-sensitive adhesive applied over the yarns), which makes for economy of manufacture and permits of a thinner tape; yet the tape is highly flexible without being stretchy or readily distortable, owing to the unique combination of filament yarns and duplex backing film described above.

The duplex backing film can be made as follows in continuous fashion, specifically illustrated by use of an oriented (tensilized) polyethylene-terephthalate polyester film having a caliper thickness in the range of 0.2 to 0.7 mil and a melting point above 450° F. A soft plastic film of polyethylene having a caliper thickness of approximately 1.0 mil is extruded upon a continuously moving web of the polyester film in the nip of a pair of pressure rollers, the temperature of the polyethylene at the point of extrusion being maintained between about 450° and 550° F. This procedure assures that the extruded polyethylene film will establish an intimate interfacial contact with the surface of the polyester film, the two films being pressed together while the polyethylene is still in a soft plastic state. There is insufficient heating of the moving polyester film to melt or distort it during this step. The composite film web after leaving the rolls is maintained at a temperature between about 225° and 300° F. (which is in the softening range of the polyethylene) and is subjected to a short period of high intensity ultra-violet irradiation directed against the polyethylene side. A suitable irradiation exposure can be provided, for instance, by a bank of 36 watt input, low-pressure, germicidal ultra-violet lamps (such as type G63T6 sold by General Electric Company) mounted so as to be spaced one inch from the web; the rate of travel of the web being such as to provide an exposure period of about 5 to 6 seconds. The web is then cooled and wound into a roll, ready for use in manufacturing the adhesive tape product.

Under these conditions, an integration of the polyester and polyethylene occurs at the interface so as to form a truly unitary duplex film. The sub-films are so strongly united that they cannot be delaminated; the interfacial union zone being stronger than the polyethylene. No delamination occurs even upon prolonged exposure to warm highly humid atmospheres, or upon exposure to water, or even upon immersion in boiling water. Immersion in oil will gradually soften the polyethylene sub-film (which is oil absorptive) but will not disintegrate the duplex film since the polyester sub-film is oilproof, and the polyethylene sub-film will not peel off owing to the oil-resistance of the interfacial bond. The interfacial bond and the polyethylene sub-film are highly resistant to sunlight deterioration. These characteristics of the duplex film enhance the utility of the adhesive tape product for usages involving exposure to high-humidities, water, oil, and sunlight. The film is moistureproof, waterproof, and oilproof. Highly weatherproof transparent adhesive tapes can be produced.

Such duplex films and the above-described process of making are described more fully in the prior copending Charbonneau and Abere application S.N. 695,532, filed November 12, 1957 (as a continuation-in-part of S.N. 547,325, filed November 16, 1955, which became abandoned after the filing of a continuation-in-part, S.N. 306,065, on September 3, 1963).

A commercially available example of oriented polyester films is "Mylar" (sold by Du Pont); which is formed of a polyester of ethylene glycol and terephthalic acid, the initial amorphous film having been drawn (stretched) to produce a crystalline type structure resulting from orientation of the polymer molecules (hence such films are referred to as "oriented"). The drawn film is hard and has a higher and narrower softening temperature range (melting point) than does the intermediate amorphous film. Use can be made of equivalent thin, strong, tough, hard, heat-resistant films of polyester polymers having polyester linkages in the polymer backbone chain, and particularly those of polybasic aromatic acids and polybasic aliphatic (including cycloaliphatic) alcohols. One such equivalent polyester film is formed of a polymer of terephthalic acid and 1,4-bis(hydroxymethylene) cyclohexane, and is marketed by Tennessee Eastman Company.

Oriented linear polyamide (nylon) films are also quite satisfactory and can be bonded in the same previously described manner to polyethylene films.

The polyethylene sub-film of the product can be a composite film such as results when a film of polyethylene is united to a polyester or polyamide film in the manner described above, following which a further polyethylene film is extruded thereupon and heat-sealed by pressing into intimate contact at a temperature within the softening range. This expedient may be employed, for example, in making colored duplex films wherein a clear transparent polyethylene film of 0.5 mil thickness is united to a clear transparent polyester or polyamide film of 0.25 or 0.5 mil thickness and is then overcoated with a further colored polyethylene film of 0.5 to 1.5 mils thickness. An opaque black duplex film can be made in this way by employing polyethylene loaded with carbon black to provide the second polyethylene film, resulting in a duplex film which has a shiny black appearance when viewed from the back side.

The yarns are of the twisted continuous filament type. Suitable yarns are available from commercial suppliers. Use can be made of either glass filament yarns or of synthetic organic textile filament yarns such as rayon yarns or nylon yarns to obtain desired properties. For instance, an illustrative glass filament yarn has a length of 15,000 yards per pound and is formed of 204 continuous glass filaments with a twist of one turn per inch. An illustrative rayon yarn is of 300 denier weight and is formed of 120 continuous rayon filaments with a twist of three turns per inch. An illustrative nylon yarn is of 210 denier weight and is formed of 34 filaments with a twist of one turn per inch. A sheet of yarns supplied from a warp beam and with the yarns aligned and spaced by a comb so as to provide the desired number of "ends" per unit of width, can be readily united to the duplex backing film in the manner previously indicated. In general, the number of ends per inch of width of the backing is in the range of 10 to 100; the yarns being considerably spaced apart when the lower number is employed and approaching (but not attaining) a shoulder-to-shoulder relationship when the higher number is employed.

High-strength tapes having a lengthwise tensile strength of at least 100 pounds per inch width or more can be manufactured. Tapes of the highest strength are obtainable when glass filament yarns are used; tensile strengths of 300 or more pounds per inch width being possible.

We claim:

1. A filament-reinforced pressure-sensitive adhesive tape wound upon itself in roll form and comprised of a flexible duplex backing film formed of a thin hard non-stretchy oriented polymer sub-film and a substantially thicker amorphous polyethylene sub-film which are interfacially integrated to form a permanently unitary composite film, said oriented polymer sub-film being inherently oilproof, waterproof, dimensionally stable, hard in the thermosoftening temperature range of said polyethylene sub-film, and providing a flat smooth back surface; a low-adhesion backsize coating upon the back surface of said oriented polymer sub-film providing the back surface of the tape; a monolayer of nonwoven longitudinal lineally-aligned continuous-filament reinforcing yarns partially embedded and autogenously anchored in the polyethylene sub-film; and an aggressively tacky rubbery pressure-sensitive adhesive coating thereon in which the yarns are partially embedded so as to be completely encased and sealed by the backing film and adhesive, the adhesive coating having a flat exposed surface facing inwardly in the wound roll and contacting said low-adhesion backsize; the adhesive tape being unwindable from the roll without splitting or delaminating.

2. An adhesive tape according to claim 1 wherein said oriented polymer sub-film is a polyester film.

3. An adhesive tape according to claim 1 wherein said oriented polymer sub-film is a polyamide film.

References Cited by the Examiner
UNITED STATES PATENTS

| | | | |
|---|---|---|---|
| 2,539,690 | 1/51 | Boorn | 154—93 |
| 2,715,077 | 8/55 | Wollinski | 117—47 |
| 2,744,041 | 5/56 | Balchen | 154—53.5 |
| 2,750,314 | 6/56 | Bemmels | 154—53.5 |
| 2,919,059 | 12/59 | Sporka | 229—3.5 |
| 2,947,415 | 8/60 | Garth. | |
| 2,958,419 | 11/60 | Kaelble | 229—3.5 |
| 3,073,734 | 1/63 | Bemmels | 154—53.5 |

EARL M. BERGERT, *Primary Examiner.*

CARL F. KRAFFT, *Examiner.*